No. 690,467. Patented Jan. 7, 1902.
S. H. SHORT.
BEARING FOR ELECTRIC MOTOR SHAFTS.
(Application filed Nov. 2, 1898.)
(No Model.) 2 Sheets—Sheet 1.
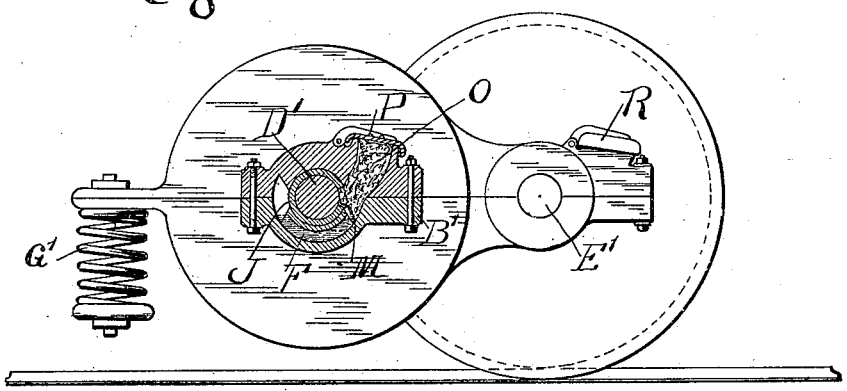
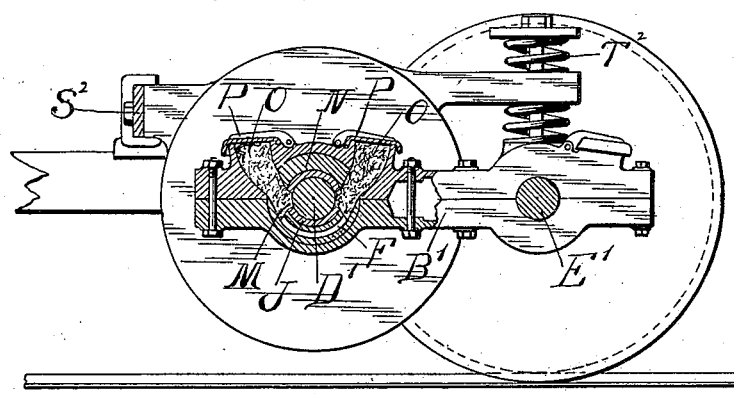
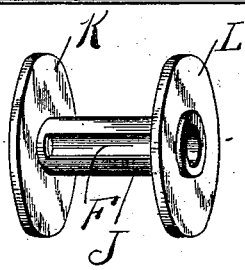
Witnesses:
J. B. Weir
E. C. Semple
Inventor:
Sidney H. Short
By Mason & Darby
Attorneys No. 690,467. Patented Jan. 7, 1902.
S. H. SHORT.
BEARING FOR ELECTRIC MOTOR SHAFTS.
(Application filed Nov. 2, 1898.)
(No Model.) 2 Sheets—Sheet 2.
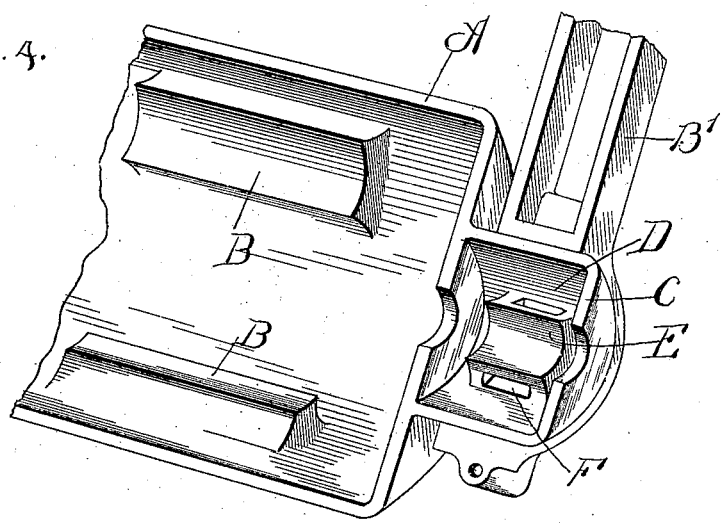
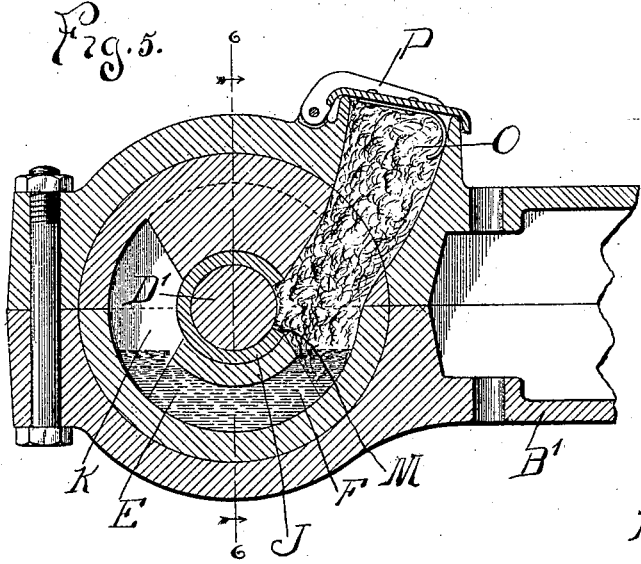
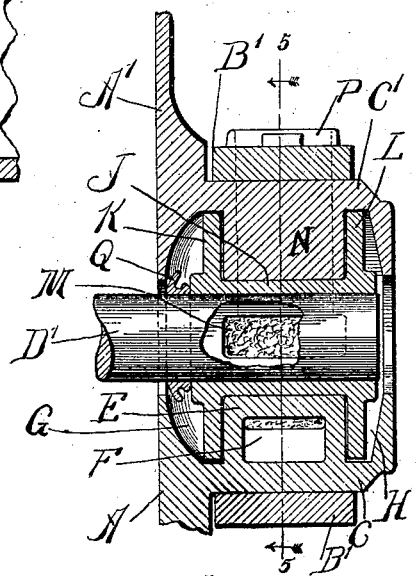
Witnesses:
J. B. Weir.
E. C. Semple.
Inventor:
Sidney H. Short
By Mowell & Darby
Attorneys

UNITED STATES PATENT OFFICE.

SIDNEY H. SHORT, OF CLEVELAND, OHIO, ASSIGNOR, BY MESNE ASSIGNMENTS, TO THE WESTINGHOUSE ELECTRIC AND MANUFACTURING COMPANY, OF PITTSBURG, PENNSYLVANIA, A CORPORATION OF PENNSYLVANIA.

BEARING FOR ELECTRIC-MOTOR SHAFTS.

SPECIFICATION forming part of Letters Patent No. 690,467, dated January 7, 1902.

Application filed November 2, 1898. Serial No. 695,287. (No model.)

*To all whom it may concern:*

Be it known that I, SIDNEY H. SHORT, a citizen of the United States, residing at Cleveland, in the county of Cuyahoga and State of Ohio, have invented a new and useful Bearing for Electric-Motor Shafts, of which the following is a specification.

This invention relates to bearings for electric-motor shafts.

The object of the invention is to provide a bearing for the shafts of electric motors and truck-axles wherein an efficient lubrication of the same may be effected.

The invention consists, substantially, in the construction, combination, location, and arrangement, all as will be more fully hereinafter set forth, as shown in the accompanying drawings, and finally specifically pointed out in the appended claims.

Referring to the accompanying drawings and to the various views and reference-signs appearing thereon, Figure 1 is a view in side elevation of a spring-suspended motor, showing a bearing for the motor-shaft constructed in accordance with my invention, the bearing, motor-shaft, and axle being in vertical transverse section. Fig. 2 is a similar view showing the application of the invention to a motor sleeved at one side upon the truck-axle. Fig. 3 is a detached detail view in perspective of the flanged bearing-bushing. Fig. 4 is a broken detached detail view in plan, partly in perspective, of the lower half or portion of the motor-casing, showing the form and arrangement of bearing embodying the principles of my invention. Fig. 5 is a broken detail view of the bearing in section on the line 5 5, Fig. 6, looking in the direction of the arrows. Fig. 6 is a similar view on the line 6 6, Fig. 5, looking in the direction of the arrows.

The same part is designated by the same reference-sign wherever it occurs throughout the several views.

The special purpose of the present invention is to provide a bearing for motor-shafts, axles, and the like particularly adapted for the use of oil as a lubricant instead of grease, as is at present the general custom. The difficulty encountered heretofore in the use of oil as a lubricant has been that by reason of the construction of the bearings the oil was forced out of the bearings and was wasted as drippings, thus not only causing loss of the oil and necessitating frequent replenishments, but also, and especially in the case of elevated railways, the oil-drippings are liable to fall upon pedestrians in the streets below. With the object of remedying these defects and avoiding the objections noted I provide the motor-casings with extensions, in which the bearing for the motor-shaft is arranged.

In Fig. 4 is shown a portion of the lower half A of the casing of an ordinary four-pole motor having the pole-pieces B, as shown, and constructed in the usual way, except that it is provided with extensions C at each end, only one end of the casing being shown in this figure of the drawings, said extensions projecting entirely outside of the motor-casing. These extensions are preferably, though not necessarily, cylindrical in form on the outside and are cored out on the inside to form chambers or cavities, (indicated at D, Fig. 4,) and a bearing-support E is formed within this chamber or cavity in the bottom thereof and raised sufficiently from the inner surface of the extension and suitably finished on its upper surface to receive the bearing which is to fit into it. A passage or opening F is cored through the bearing-support E to permit the oil to pass through freely from one side to the other. It will be observed that the raised bearing projection E does not extend the entire length of the extension C, thus leaving the spaces G H at each end thereof. (See Fig. 6.)

In Fig. 3 is shown the form of bearing-sleeve J which I employ in connection with my improved form of bearing. This sleeve is cylindrical and tubular to receive therethrough the shaft or axle and at each end is provided with integral flanges K L. These flanges are preferably of a diameter adapting them to practically fill the spaces cored out of the extension C, as at G H, and the length of the sleeve between the flanges corresponds to the length of the bearing block or rest E. In one or both sides of the bearing-sleeve J is formed an opening M, extending nearly the entire length of such sleeve. From this construction it will be readily seen that by packing waste into the cavity or chamber D and between the flanges K L, so as to project through the openings M, oil contained in the chamber or cavity D will be efficiently carried to almost the entire length of the bearings, and thereby effect a thorough lubrication of the same.

The upper half A' of the motor-casing is provided with an extension C', similar to and coöperating with the extension C of the lower half. It is provided with a projection N, corresponding in length to the length of bearing support or rest E of the lower half, and when the two sections A A' are assembled and bolted together the bearing-sleeve J is firmly clamped and held between the proximate surfaces of the blocks or supports E N, with the flanges K L in close proximity to the side or end surfaces of said projections, as clearly shown in Fig. 6. It is evident that an oil-passage in the projection N of the upper section of casing similar to the passage F through the projection E of the lower half of the casing is unnecessary.

A channel O is formed in the motor-casing, through which the oil and waste are introduced to the bearing. This channel is provided with a cover or cap P, by which it may be covered.

It is evident that a channel O may be provided on both sides of the bearing, as shown in Fig. 1, or only on one side, as shown in Figs. 2 and 5.

From the foregoing description it will be seen that the waste employed to carry the oil to the bearing-surface to be lubricated is confined between the flanges K L, and is thus prevented from reaching the oil-throwing disk Q. Hence all the oil forced out of the bearing at either end is collected and retained in the cavities G H and thence flows back into the chamber D to be used over again. Thus I provide a construction of bearing wherein an efficient lubrication is secured and maintained, wherein oil is employed as the lubricant, wherein the oil is not wasted, but is used over and over again, and wherein dripping from the bearing is prevented.

It is obvious that bearings constructed in accordance with the principles of my invention may be used for the truck-axles as well as for the motor-shaft, and in Fig. 2 I have indicated at R the covering for the channel, which, together with the other features of the bearing, may be identical in construction, arrangement, and function with those above described. It is also obvious that a bearing such as above described and embodying the principles of my invention may be employed on any form or arrangement of motor and whatever may be the method or manner of mounting the same. For instance, and as shown in Fig. 1, the motor is spring-suspended at both sides, as at S² T², in a manner familiar to persons skilled in the art. In this method of suspension guiding-arms B' (see also Fig. 4) are employed to maintain proper alinement of the motor-shaft D' with relation to the truck-axle E', such guiding-arms being journaled at one end concentric with the axle and at the other end concentric with the motor-shaft. In this form of motor-mounting the bearing extensions C C' (see Figs. 5 and 6) are cylindrical on their exterior surface and the guiding-arms B' are clamped therearound in a manner to permit of a relative rocking movement of the motor and guiding-arms.

In other forms of motor suspension the projections C C' are similarly received and supported. For instance, I have shown in Fig. 2, as illustrative of the principles involved, a form of motor suspension wherein the side arms of the motor-frame are sleeved directly upon the truck-axle to form a support for one side of the motor, the motor being suitably supported at the other side in any suitable manner, as by means of the spring G'. It is evident, however, that my invention is not dependent upon the style or form of motor nor on the particular manner of mounting the same upon the truck. It is also evident than many variations and changes in the specific details of construction and arrangement would readily suggest themselves to persons skilled in the art and still fall within the spirit and scope of my invention. I do not desire, therefore, to be limited or restricted to the exact details shown and described; but, Having now set forth the objects and nature of my invention and a construction embodying the same, and having explained the purpose, function, and mode of operation of such construction, what I claim as new and useful and of my own invention, and desire to secure by Letters Patent, is—

1. The combination with a motor-casing having an extension, said extension having an oil-chamber formed therein, of a bearing-sleeve arranged in said chamber and adapted to receive the motor-shaft therethrough, said sleeve being of smaller dimensions than the chamber and having a passage or opening through the side thereof, as and for the purpose set forth.

2. In an oil-bearing for shafts, a casing having an oil-chamber formed therein, a bearing-block formed in said chamber, said block being of shorter length and width than said chamber, a bearing-sleeve corresponding in length and diameter to the length and width of said block, and adapted to receive the shaft therethrough, said sleeve arranged in said chamber to be supported upon said block, flanges formed on said sleeve at the ends thereof and arranged to fill the chamber at the ends of said block, said sleeve having an opening through the side thereof, as and for the purpose set forth.

3. In an oil-bearing for shafts, a casing having a chamber formed therein, a bearing-sleeve arranged in said chamber and adapted to receive the shaft, said sleeve being of shorter dimensions than the chamber, and provided with openings through the side thereof, said sleeve provided with flanges at the ends thereof adapted to fill the chamber, as and for the purpose set forth.

4. In an oil-bearing for shafts, a casing having a chamber formed therein, a bearing-block formed in said chamber, said block being of shorter length and width than the length and width of the chamber and having a passage formed transversely therethrough and a bearing-sleeve having a cylindrical portion of smaller dimensions than the chamber, and end flanges, said end flanges arranged to extend along the end surface of the bearing-block and to fill the space of the chamber at that point, said sleeve provided with an opening through the side thereof, as and for the purpose set forth.

5. In a bearing, a casing having a chamber formed therein, a bearing-block raised from the inner surface of said chamber, said block being of shorter length and breadth than the chamber thereby leaving cavities at each end and on opposite sides thereof, a bearing-sleeve of smaller dimensions than the chamber and having an opening through the side thereof, said sleeve provided with flanges adapted to extend into and fill said end cavities, said casing provided with a channel delivering into said chamber and a point between said flanges, as and for the purpose set forth.

6. The combination with a motor-casing having chambered extensions at the ends thereof, said extensions forming oil-chambers, of guiding-arms for the motor, said arms being journaled upon said extensions, as and for the purpose set forth.

7. The combination with a motor-shaft and axle, of a motor-casing having extensions at its ends, said extensions forming oil-chambers for the motor-shaft bearings, and guiding-arms journaled at their ends respectively upon the axle and said bearing extensions, as and for the purpose set forth.

In witness whereof I have hereunto set my hand this 24th day of October, 1898, in the presence of the subscribing witnesses.

SIDNEY H. SHORT.

Witnesses:
M. A. KENSINGER,
JOHN J. BEVER.